(12) United States Patent
Nyeholt et al.

(10) Patent No.: US 9,689,353 B2
(45) Date of Patent: Jun. 27, 2017

(54) CHARGE AIR COOLER DEVICE

(71) Applicant: GM Global Technology Operations LLC, Detroit, MI (US)

(72) Inventors: Christopher C. Nyeholt, Armada, MI (US); James A. Lasecki, Farmington Hills, MI (US); John D. Wyatt, Troy, MI (US); Ian D. Butcher, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/837,765

(22) Filed: Aug. 27, 2015

(65) Prior Publication Data

US 2017/0058841 A1 Mar. 2, 2017

(51) Int. Cl.
```
F02B 29/04      (2006.01)
F02M 26/31      (2016.01)
F02M 26/27      (2016.01)
F28B 9/08       (2006.01)
F28F 1/02       (2006.01)
```

(52) U.S. Cl.
CPC ......... *F02M 26/31* (2016.02); *F02B 29/0456* (2013.01); *F02M 26/27* (2016.02); *F28B 9/08* (2013.01); *F28F 1/022* (2013.01)

(58) Field of Classification Search
CPC .............. F02B 29/0456; F02B 29/0468; F02B 29/0475; F02M 26/27; F02M 26/31; Y02T 10/121; Y02T 10/146; F28F 9/002; F28F 1/022; F28F 2009/029; F28D 1/05333; F28D 2021/0082; F28B 9/08
See application file for complete search history.

(56) References Cited

U.S. PATENT DOCUMENTS

| | | | |
|---|---|---|---|
| 6,301,887 B1* | 10/2001 | Gorel ................... | F01N 3/0222 123/563 |
| 2005/0081523 A1* | 4/2005 | Breitling ............. | F02B 29/0418 60/599 |
| 2007/0051503 A1* | 3/2007 | Grajzl ................. | F02B 29/0456 165/152 |
| 2007/0175612 A1* | 8/2007 | Hendrix .............. | F02B 29/0418 165/101 |
| 2007/0261400 A1* | 11/2007 | Digele ................ | F01N 3/05 60/320 |
| 2008/0078533 A1* | 4/2008 | Tolani ................ | F02B 29/0462 165/133 |
| 2009/0090486 A1* | 4/2009 | Geskes ............... | F28D 7/06 165/51 |
| 2009/0223493 A1* | 9/2009 | Rutherford ......... | F02B 29/0468 123/542 |
| 2010/0050997 A1* | 3/2010 | Huber ................. | F02B 29/0412 123/563 |
| 2010/0077995 A1* | 4/2010 | Buia ................... | F02B 29/0468 123/542 |
| 2010/0242929 A1* | 9/2010 | Kardos .............. | F02B 29/0431 123/568.12 |

(Continued)

*Primary Examiner* — Hieu T Vo
*Assistant Examiner* — Arnold Castro
(74) *Attorney, Agent, or Firm* — Cantor Colburn LLP

(57) ABSTRACT

A charge air cooler (CAC) device includes a body including an inlet end, an outlet end, and a plurality of passages extending between the inlet end and the outlet end. At least one of the plurality of passages is covered by an inlet blocking member at the inlet end.

18 Claims, 7 Drawing Sheets

(56) References Cited

U.S. PATENT DOCUMENTS

| | | | |
|---|---|---|---|
| 2011/0107760 A1 | 5/2011 | Quinn et al. | |
| 2013/0098341 A1* | 4/2013 | Yoon | F02B 29/0456 123/568.12 |
| 2013/0220457 A1* | 8/2013 | Bishop | F02B 29/0468 137/544 |
| 2014/0100074 A1* | 4/2014 | Glugla | B60W 20/15 477/3 |
| 2014/0325959 A1* | 11/2014 | McConville | F02B 29/0418 60/273 |
| 2015/0113979 A1* | 4/2015 | Surnilla | F02B 29/04 60/599 |
| 2015/0167539 A1* | 6/2015 | Basile | F02B 29/0468 60/599 |
| 2015/0369119 A1* | 12/2015 | Sharma | F02B 29/0468 60/599 |
| 2016/0076826 A1* | 3/2016 | Augenstein | F28F 17/005 165/110 |
| 2016/0177881 A1* | 6/2016 | Wicks | F02M 25/0728 123/568.12 |

\* cited by examiner

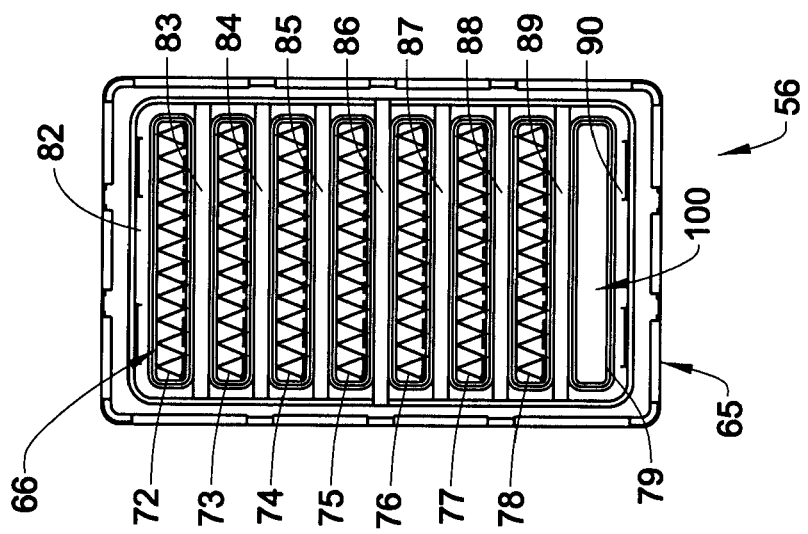
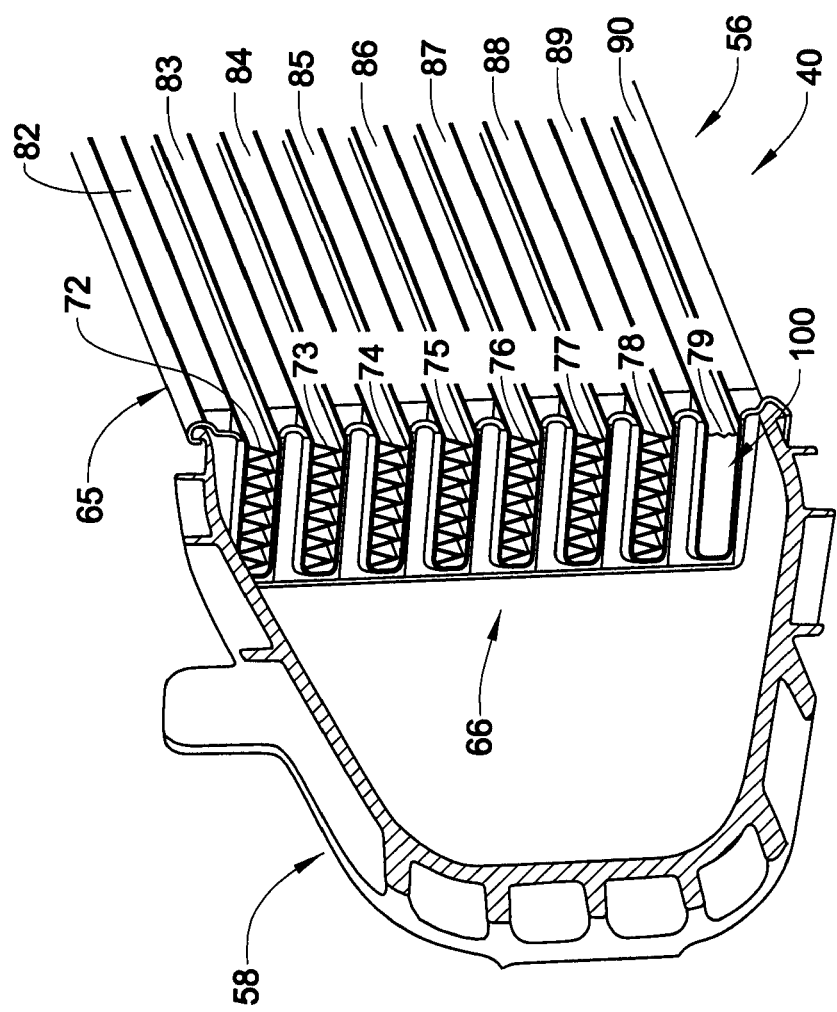

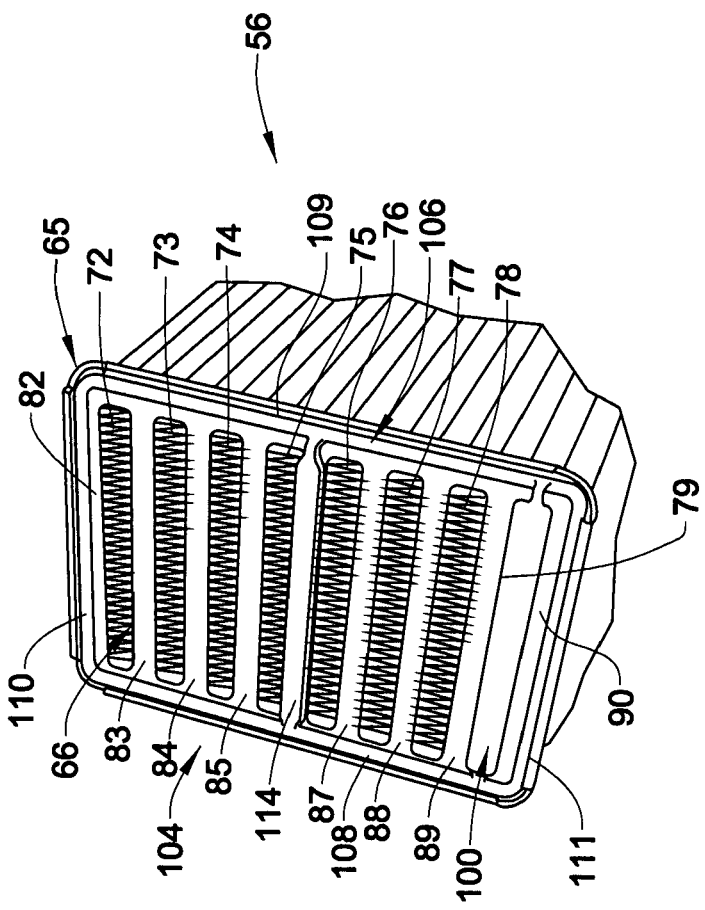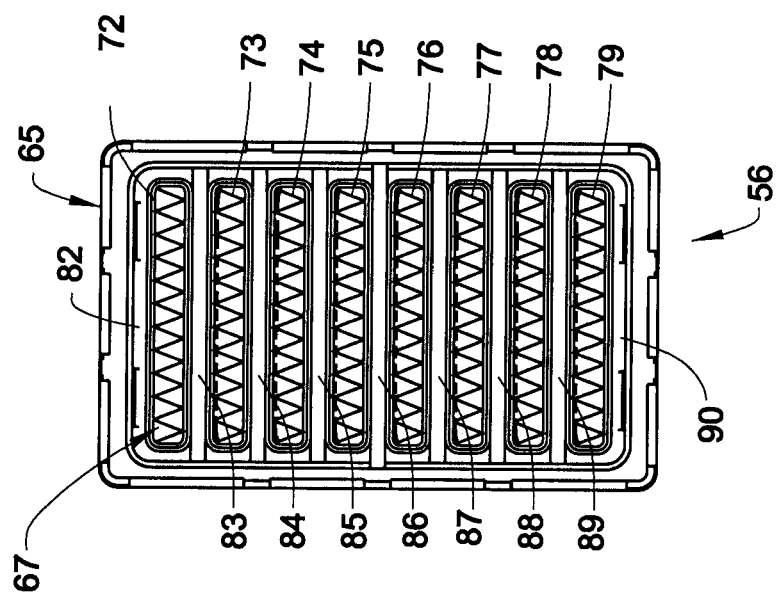

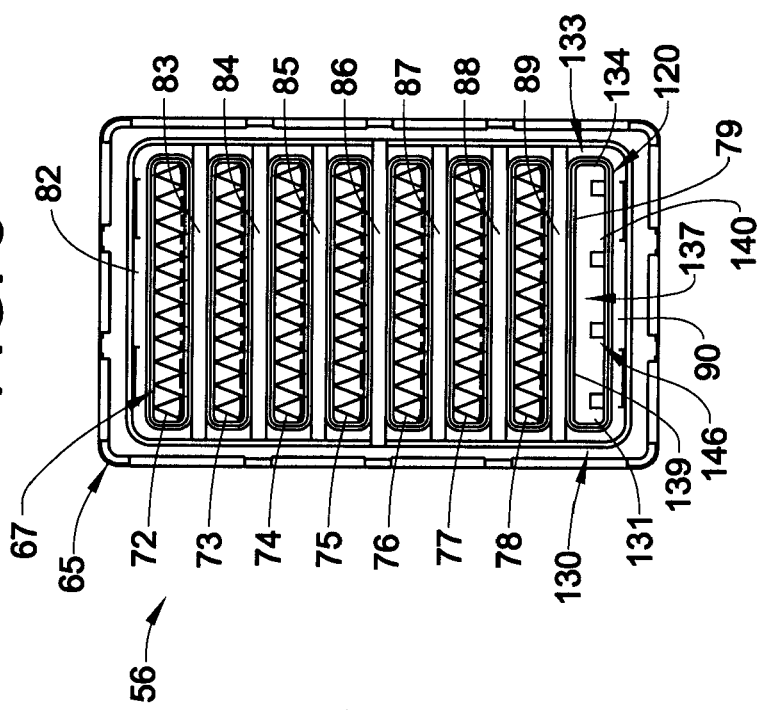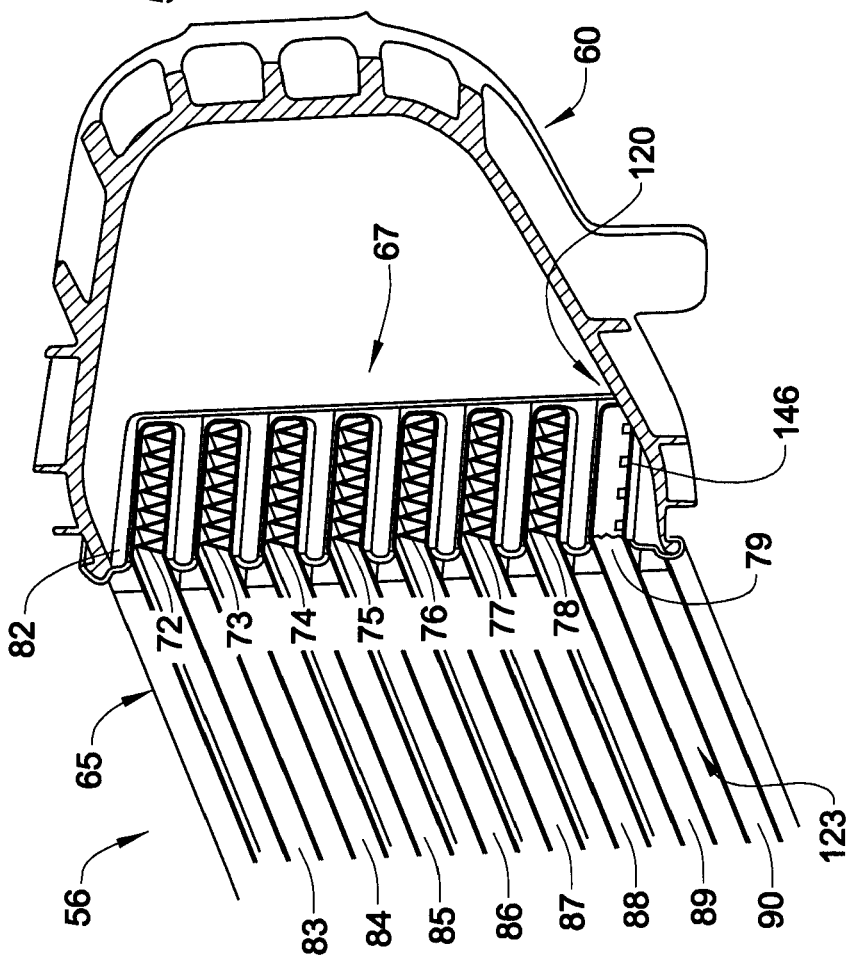

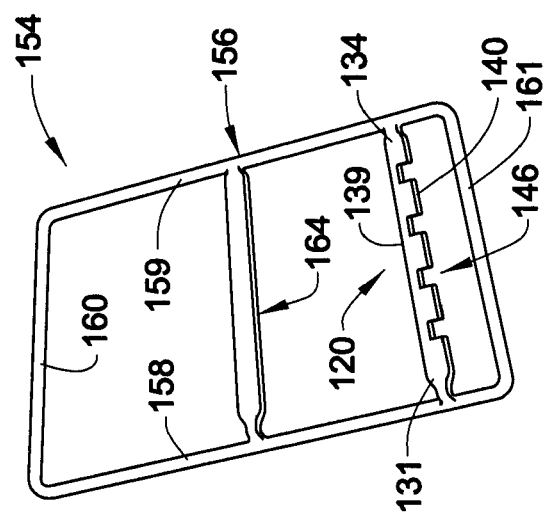
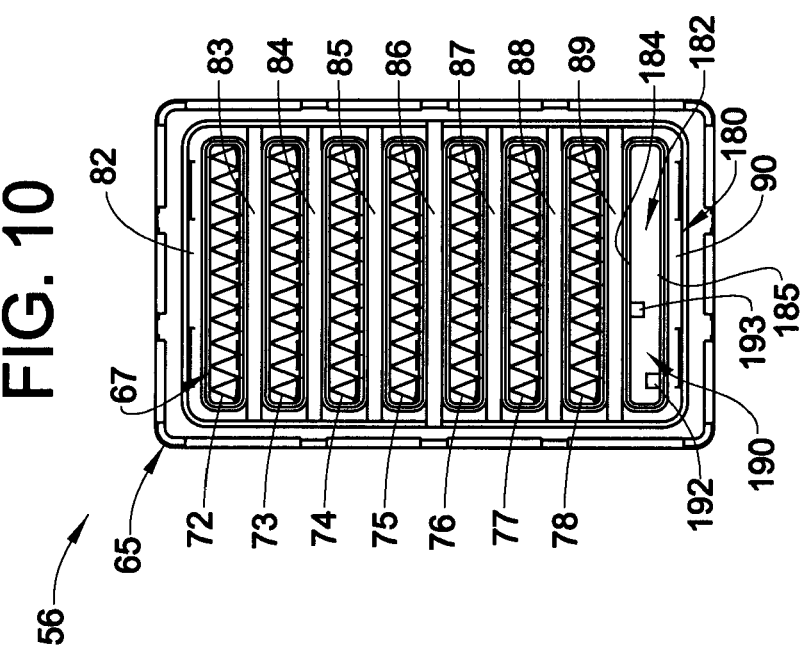

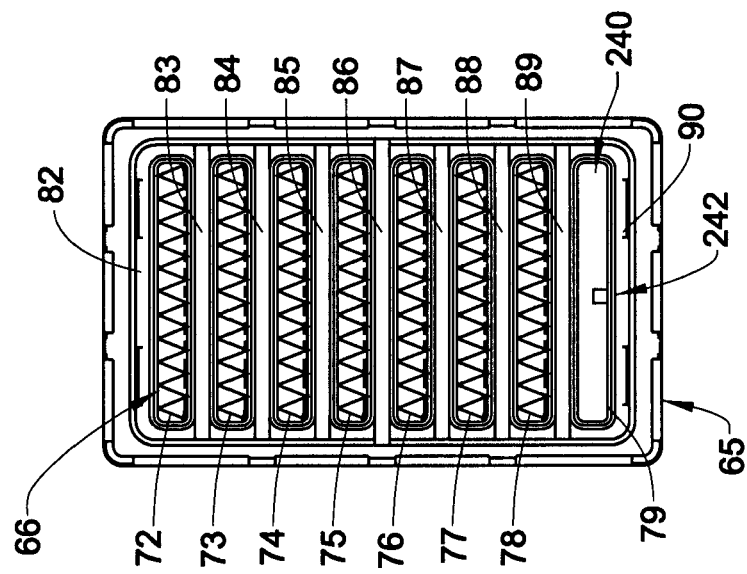

CHARGE AIR COOLER DEVICE

FIELD OF THE INVENTION

Exemplary embodiments relate to heat exchange devices and, more particularly to a charge air cooler (CAC) device.

BACKGROUND OF THE INVENTION

A charge air cooler (CAC) device is typically installed into an engine system to cool intake air after passing through a turbocharger and prior to entry to a combustion chamber. The CAC device passes the intake air in a heat exchange relationship with ambient air. The heat exchange results in a reduction in intake air temperature. Cooling intake air prior to entry into the combustion chamber enhances combustion efficiency resulting in fewer undesirable emissions. It is less desirable to ingest condensation along with the intake air.

Accordingly, it is desirable to provide a CAC device with a mechanism for reducing, or at least controlling, condensation ingestion into the engine system.

SUMMARY

In one exemplary embodiment, a charge air cooler (CAC) device includes a body including an inlet end, an outlet end, and a plurality of passages extending between the inlet end and the outlet end. At least one of the plurality of passages is covered by an inlet blocking member at the inlet end.

In another exemplary embodiment, a motor vehicle includes a body having an engine compartment. An engine system including an engine inlet intake system is arranged in the engine compartment. A turbocharger is arranged upstream of and fluidically connected with the engine inlet. A charge air cooler (CAC) device is fluidically connected between the turbocharger and the engine inlet. The CAC device includes a body having an inlet end, an outlet end, and a plurality of passages extending between the inlet end and the outlet end. At least one of the plurality of passages is covered by an inlet blocking member at the inlet end.

The above features and advantages and other features and advantages of the invention are readily apparent from the following detailed description of the embodiments when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 depicts an inlet end of a CAC device having an inlet blocking member, in accordance with an exemplary embodiment;

FIG. 4. depicts an end view of the inlet end of the CAC device of FIG. 3;

FIG. 5 depicts an end view of an outlet end of the CAC device of FIG. 3;

FIG. 6 depicts an inlet blocking member provided on the inlet end of the CAC device of FIG. 4;

FIG. 7 depicts an outlet end of a CAC device, in accordance with another aspect of an exemplary embodiment;

FIG. 8 depicts an end view of the outlet end of the CAC device of FIG. 7;

FIG. 9 depicts an outlet blocking member in accordance with an aspect of an exemplary embodiment;

FIG. 10 depicts an outlet blocking member, in accordance with another aspect of an exemplary embodiment;

FIG. 11 depicts a schematic sectional view of a condensate collection tank of a CAC device, in accordance with an aspect of an exemplary embodiment; and FIG. 12 depicts an end view of the inlet end of the CAC device of FIG. 3 including an inlet blocking member, in accordance with another aspect of an exemplary embodiment.

DESCRIPTION OF THE EMBODIMENTS

Figure 1:
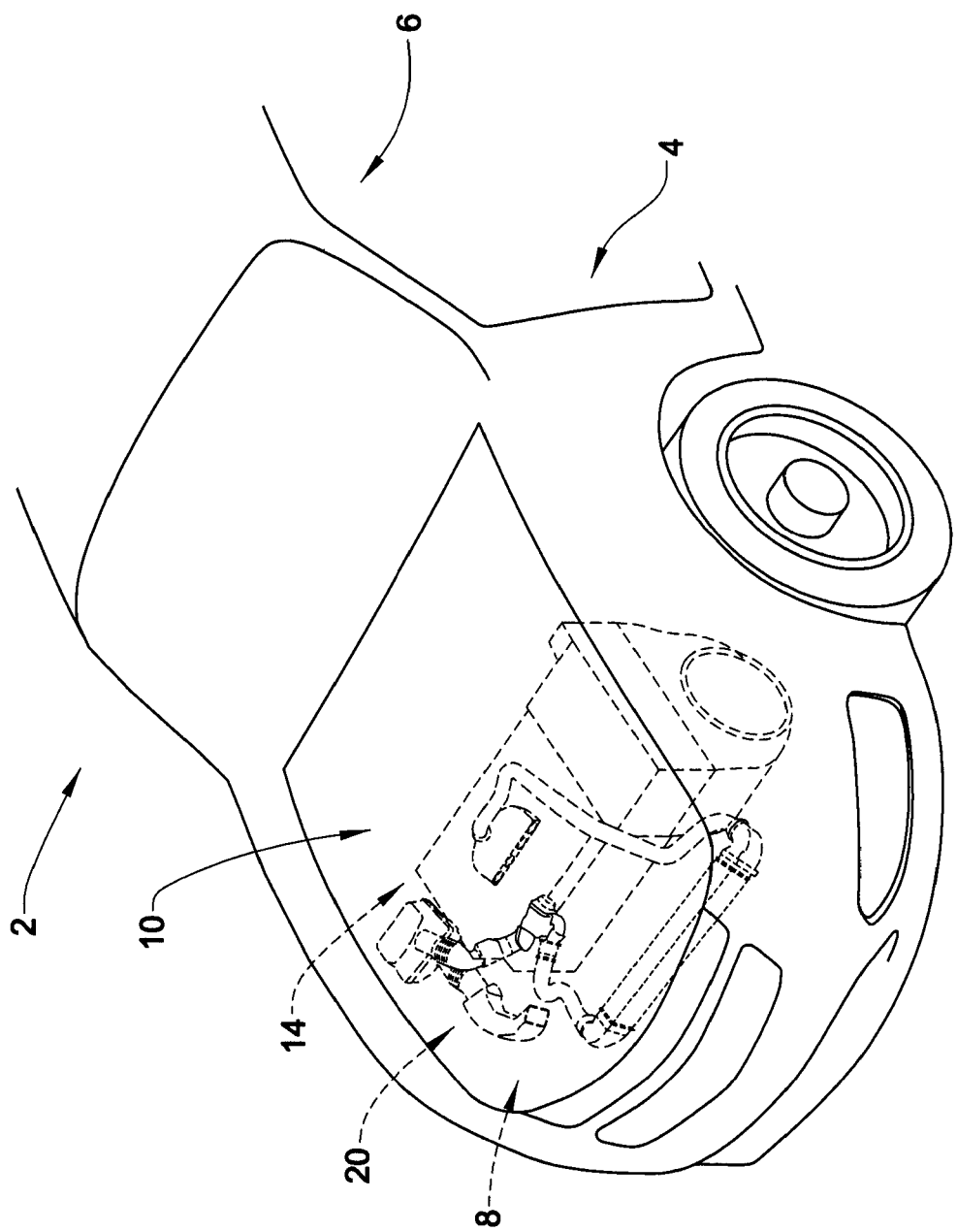
FIG. 1 depicts a motor vehicle including an engine system provided with a charge air cooler (CAC) device, in accordance with an exemplary embodiment.

The following description is merely exemplary in nature and is not intended to limit the present disclosure, its application or uses. It should be understood that throughout the drawings, corresponding reference numerals indicate like or corresponding parts and features. A motor vehicle, in accordance with an exemplary embodiment, is indicated generally at 2, in FIG. 1. Motor vehicle 2 includes a body 4 defining, at least in part, a passenger compartment 6 and an engine compartment 8 having a hood 10. Engine compartment 8 houses an engine system 14. It should be understood that engine system 14 may represent an internal combustion engine or a hybrid engine including an internal combustion power component and an electric power component. It should also be understood that the position of engine system 14, e.g., front, rear, mid, may vary. Engine system 14 includes an intake system 20 that delivers ambient air into combustion chambers (not shown) to form part of a combustion process.

Figure 2:
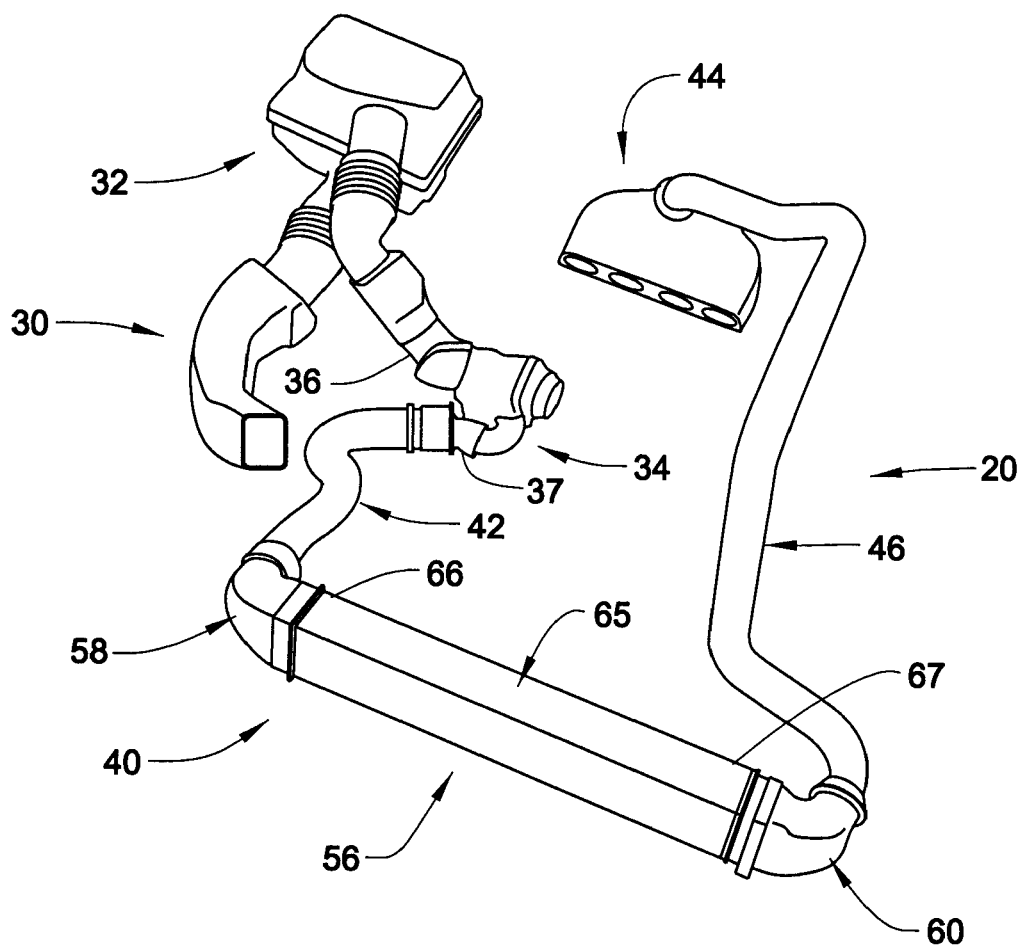
FIG. 2 depicts a portion of an intake system including a CAC device, in accordance with an exemplary embodiment.

As shown in FIG. 2, intake system 20 includes an air inlet 30 fluidically connected to a filter assembly 32. Intake system 20 also includes a turbocharger 34 having an inlet 36 fluidically connected to filter assembly 32 and an outlet 37 fluidically connected to a charge air cooler (CAC) device 40 through a CAC inlet duct 42. CAC device 40 is fluidically connected to an engine inlet 44 through a CAC outlet duct 46. CAC device 40 includes a heat exchanger member 56 connected to CAC inlet duct 42 through an inlet housing 58 and to CAC outlet duct 46 through an outlet housing 60.

Referring to FIGS. 3-5, heat exchanger member 56 includes a body 65 having an inlet end 66 and an outlet end 67. A first plurality of passages 72-79 extend between inlet end 66 and outlet end 67 fluidically connecting inlet housing 58 and outlet housing 60. A second plurality of passages 82-90 pass transversely through body 65. In this manner, air passing from turbocharger 34 flows through heat exchanger member 56 through first plurality of passages 72-79 in a heat exchange relationship with ambient air flowing across body 65 through second plurality of passages 82-90. The air passing into outlet housing 60 is at a temperature that is lower than the air entering through inlet housing 58. The reduction in temperature leads to enhanced combustion efficiency and a reduction in undesirable emissions.

In order to mitigate issues connected with condensation being ingested into engine system 14 via engine inlet 44, heat exchanger member 56 includes an inlet blocking member 100 provided across one of the first plurality of passages 72-79. In accordance with an aspect of an exemplary embodiment, passage 72 represents a top-most passage and passage 79 represents a bottom most passage with passages 73-78 representing intermediate passages. Inlet blocking member 100 is positioned across bottom most passage 79 to substantially block airflow from passing into inlet end 66 via bottom most passage 79.

In accordance with an aspect of an exemplary embodiment illustrated in FIG. 6, inlet blocking member 100 forms part of an inlet gasket 104 having a peripheral edge 106 that extends about inlet end 66. Inlet gasket 104 is formed from an elastic, e.g., flexible, pliable material that may accommodate changes in temperature to ensure sealing across a wide range of operating environments. Peripheral edge 106 includes a first side 108, an opposing, second side 109, a third side 110, and a fourth side 111. Third and fourth sides 110 and 111 connect with first and second sides 108 and 109. Inlet blocking member 100 extends between first and second sides 108 and 109 across bottom most passage 79. In addition, a support element 114 may extend between first and second sides 108 and 109 across an unexposed end (not separately labeled) of one of the second plurality of passages 82-90. Support element 114 aids in maintaining peripheral edge 106 in place about inlet end 66.

In accordance with another aspect of an exemplary embodiment illustrated in FIGS. 7-8, heat exchanger member 56 includes an outlet blocking member 120 that extends across bottom most passage 79 at outlet end 67. Outlet blocking member 120 controls, meters, or otherwise limits an amount of condensation in bottom most passage 79 passing into outlet housing 60. In accordance with an aspect of an exemplary embodiment, outlet blocking member 120, together with inlet blocking member 100, may form a condensate collection tank 123 (FIG. 7) at bottom most passage 79. Outlet blocking member 120 includes a first end 130 defined by a first edge portion 131, an opposing second end 133 defined by a second edge portion 134, and an intermediate portion 137. Intermediate portion 137 includes a first edge section 139 and an opposing second edge section 140. In accordance with an aspect of an exemplary embodiment, first and second edge portions 131 and 133 define a dimension of outlet blocking member 120 that is greater than a dimension defined between first and second edge sections 139 and 140.

In the embodiment shown, first edge section 139 defines an upper edge of outlet blocking member 120 and second edge section 140 defines a lower edge of outlet blocking member 120. In further accordance with an aspect of an exemplary embodiment, a plurality of openings, one of which is indicated at 146, extend across intermediate portion 137. The size and number of openings may vary. In accordance with an aspect of an exemplary embodiment, openings 146 are exposed at second edge section 140. In this manner, openings 146 may provide a metered passage for condensate to flow into bottom most passage 79 from outlet housing 60 and from bottom most passage 79 back into outlet housing 60 towards engine inlet 44.

In accordance with an aspect of an exemplary embodiment illustrated in FIG. 9, outlet blocking member 120 forms part of an outlet gasket 154 having a peripheral edge 156 that extends about outlet end 67. Outlet gasket 154 is formed from an elastic, e.g., pliable material that may accommodate changes in temperature to ensure sealing across a wide range of operating environments. Peripheral edge 156 includes a first side section 158, an opposing, second side section 159, a third side section 160 and a fourth side section 161. Third and fourth side sections 160 and 161 connect with first and second side sections 158 and 159. Outlet blocking member 120 extends between first and second side sections 158 and 159 across bottom most passage 79. In addition, a support member 164 may extend between first and second side sections 158 and 159 across an unexposed end (not separately labeled) of one of the second plurality of passages 82-90. Support member 164 aids in maintaining peripheral edge 156 in place about outlet end 67.

FIG. 10 illustrates an outlet blocking member 180 in accordance with another aspect of an exemplary embodiment. Outlet blocking member 180 includes an intermediate portion 182 having a first edge section 184 and an opposing, second edge section 185. A plurality of openings 190 including a first opening 192 and a second opening 193, may be formed in intermediate portion 182. At this point it should be understood that the size and number of openings may vary. First opening 192 is exposed at first edge section 184 while second opening 193 is exposed at second edge section 185. With this arrangement, outlet blocking member 180 may provide control over condensate passing out from bottom most passage 79 during inertia generating maneuvers, such as driving through a curve and the like.

FIG. 11 illustrates a heat exchanger member 204 in accordance with yet another aspect of an exemplary embodiment. In the exemplary embodiment shown, bottom most passage 79 includes a first sealed end 206 at inlet end 66 and a second sealed end 207 at outlet end 67 forming a condensate collection tank 210. Condensate collection tank 210 may be fluidically connected to an adjacent one of the first plurality of passages 72-79, such as passage 78, through a plurality of openings 212. In this manner, condensate may accumulate in condensate collection tank 210 and either evaporate, or metered amounts may pass into outlet housing 60 during periods of greater airflow, such as during an acceleration event. FIG. 12 depicts an inlet blocking member 240 including a metered opening 242 that is sized and arranged to allow oil from crankcase ventilation to pass through CAC device 40 and/or provide a desired metering of condensate ingestion.

At this point it should be understood that the exemplary embodiments provide a system for reducing condensate ingestion during periods of higher airflow, such as during an acceleration event. Ingesting undesirable or unmetered amounts of condensate during an acceleration event may lead to engine misfires and reduced performance. It should also be understood that condensate may accumulate due to a pressure induced increased dew point of inlet air passing through the CAC device. The condensate may collect in the CAC outlet housing and be ingested into the engine. By blocking an inlet of one of the heat exchange passages, the condensate may collect and be dispensed into the engine at a slower rate. By blocking the outlet of one of the heat exchange passages, condensate may collect and experience more residence time within the CAC device. The longer residence time, may allow for some evaporation that would further reduce condensate ingestion. Finally, providing openings in the outlet blocking member may reduce an amount of condensate that may pass into the CAC outlet housing during each acceleration event. Reducing condensate ingestion in accordance with an exemplary embodiment will lead to improved engine performance.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A charge air cooler (CAC) device comprising:
a body including an inlet end, an outlet end, and a plurality of passages extending between the inlet end and the outlet end, at least one of the plurality of passages including an opening covered by an inlet blocking member at the inlet end, the inlet blocking member comprising a gasket formed from a flexible material mounted to the body and extending across the opening substantially blocking airflow into the at least one of the plurality of passages.

2. The CAC device according to claim 1, wherein the plurality of passages includes a top most passage and a bottom most passage, the inlet blocking member being provided on the bottom most passage.

3. The CAC device according to claim 1, wherein the inlet blocking member includes at least one metered opening.

4. The CAC device according to claim 1, further comprising: an outlet blocking member provided on the at least one of the plurality of passages at the outlet end, the inlet blocking member, outlet blocking member, and the one of the plurality of passages defining a condensate collection tank.

5. The CAC device according to claim 4, wherein the outlet blocking member includes at least one opening fluidically exposing the outlet end of the one of the plurality of passages to the outlet end of others of the plurality of passages.

6. The CAC device according to claim 4, wherein the outlet blocking member includes a first end including a first edge portion, a second end including an opposing, second edge portion, and an intermediate portion having first and second opposing edge sections, the at least one opening being exposed at one of the first and second opposing edge sections.

7. The CAC device according to claim 6, wherein the first and second edge sections define a dimension of the outlet blocking member that is greater than a dimension defined by the first and second edge portions, the at least one opening including a plurality of openings extending between the first and second edge portions exposed at the one of the first and second edge sections.

8. The CAC device according to claim 6, wherein the first and second edge sections define a dimension of the outlet blocking member that is greater than a dimension defined by the first and second edge portions, the at least one opening including a first opening exposed at the first edge section and a second opening exposed at the second edge section.

9. The CAC device according to claim 4, wherein the plurality of passages includes a top most passage and a bottom most passage, and at least one intermediate passage, the condensate collection tank comprising the bottom most passage and being fluidically connected to the at least one intermediate passage through at least one opening spaced from the inlet end and the outlet end.

10. A motor vehicle comprising:
a body including an engine compartment;
an engine system including an engine inlet arranged in the engine compartment;
a turbocharger arranged upstream of, and fluidically connected with, the engine inlet; and
a charge air cooler (CAC) device fluidically connected between the turbocharger and the engine inlet, the CAC device comprising:
a body including an inlet end, an outlet end, and a plurality of passages extending between the inlet end and the outlet end, at least one of the plurality of passages including an opening covered by an inlet blocking member at the inlet end, the inlet blocking member comprising a gasket formed from a flexible material mounted to the body and substantially blocking airflow into the at least one of the plurality of passages.

11. The motor vehicle according to claim 10, wherein the plurality of passages includes a top most passage and a bottom most passage, the inlet blocking member being provided on the bottom most passage.

12. The motor vehicle according to claim 10, wherein the inlet blocking member includes at least one metered opening.

13. The motor vehicle according to claim 10, further comprising: an outlet blocking member provided on the at least one of the plurality of passages at the outlet end, the inlet blocking member, outlet blocking member, and the one of the plurality of passages defining a condensate collection tank.

14. The motor vehicle according to claim 13, wherein the outlet blocking member includes at least one opening fluidically exposing the outlet end of the one of the plurality of passages to the outlet end of others of the plurality of passages.

15. The motor vehicle according to claim 13, wherein the outlet blocking member includes a first end including a first edge portion, a second end including an opposing, second edge portion, and an intermediate portion having first and second opposing edge sections, the at least one opening being exposed at one of the first and second edge sections.

16. The motor vehicle according to claim 15, wherein the first and second edge sections define a dimension of the outlet blocking member that is greater than a dimension defined by the first and second edge portions, the at least one opening including a plurality of openings extending between the first and second edge portions exposed at the one of the first and second edge sections.

17. The motor vehicle according to claim 15, wherein the first and second edge sections define a dimension of the outlet blocking member that is greater than a dimension defined by the first and second edge portions, the at least one opening including a first opening exposed at the first edge section and a second opening exposed at the second edge section.

18. The motor vehicle according to claim 13, wherein the plurality of passages includes a top most passage and a bottom most passage, and at least one intermediate passage, the condensate collection tank comprising the bottom most passage and being fluidically connected to the at least one intermediate passage through at least one opening spaced from the inlet end and the outlet end.

* * * * *